chamber communicating with said primary combustion chamber at its lower end, means for delivering the products of combustion from the upper end of said secondary combustion chamber, baffles extending alternately from the inner and outer walls of the secondary combustion chamber, conduits for flammable gases or vapors and for air respectively leading to said inner combustion chamber, a solid oxidizing material in said secondary chamber capable of temporarily supplying sufficient oxygen to maintain complete combustion of said flammable gases or vapors and producing upon reduction a residue capable of combining with unconsumed oxygen supplied to said secondary chamber in excess of the amount required for complete combustion of the flammable gases or vapors and means operable by the yielding movement of said retort caused by variations in weight of said retort and its contents to vary the relative amounts of flammable gases or vapors and air supplied to said combustion chambers.

14. A heating apparatus comprising a casing, a retort within said casing having an inner wall providing a primary combustion chamber and an outer wall concentric therewith and spaced apart therefrom providing a secondary combustion chamber, said outer wall having at its upper end an extension forming a flue and pivotally mounted upon said casing, an arm extending from said retort provided with an adjustable counter-weight, conduits for flammable gases or vapors and for air respectively leading to said primary combustion chamber, valves in the respective conduits, and means adjustably connecting said counterweighted arm to the valve in the conduit for flammable gases or vapors operable by the movement of said retort upon variations in the weight of the retort and its contents to control the amount of flammable gases or vapors supplied, and an oxidizing agent in said secondary combustion chamber capable of temporarily supplying sufficient oxygen to insure complete combustion of said flammable gases or vapors and producing upon reduction a residue capable of combining with the oxygen supplied by an excess of air admitted to said combustion chambers.

15. A heating apparatus comprising a casing, a retort within said casing having an inner wall providing a primary combustion chamber and an outer wall concentric therewith and spaced apart therefrom providing a secondary combustion chamber, said outer wall having at its upper end an extension forming a flue and pivotally mounted upon said casing, an arm extending from said retort provided with an adjustable counter-weight, conduits for flammable gases or vapors and for air respectively leading to said primary combustion chamber, valves in the respective conduits, and means adjustably connecting said counterweighted arm to the valve in the conduit for flammable gases or vapors operable by the movement of said retort upon variations in the weight of the retort and its contents to control the amount of flammable gases or vapors supplied, an oxidizing agent in said secondary combustion chamber capable of temporarily supplying sufficient oxygen to insure complete combustion of said flammable gases or vapors and producing upon reduction a residue capable of combining with the oxygen supplied by an excess of air admitted to said combustion chambers, and thermostatic means, subject to the temperature of the medium to be heated, connected to the valve in the air conduit to control the amount of air supplied, whereby the respective regulations of the supply of flammable gases or vapors and air will co-operate to control the output of heat produced by said heating apparatus.

16. A device for controlling the air-fuel ratio in combustion comprising a combustion chamber, a yieldably mounted retort having an inner wall providing a primary combustion chamber and a surrounding secondary chamber, means for passing the hot flammable gases or vapors from said combustion chamber into said secondary chamber, an oxidizing material in said secondary chamber capable of temporarily supplying sufficient oxygen to consume all the fuel in said flammable gases or vapors and producing upon reduction a residue capable of combining with unconsumed oxygen supplied in excess of the amount required for complete consumption of the said flammable gases or vapors and means operable by the movement of said retort caused by variations in weight of said retort and its contents to vary the relative amounts of air and flammable gases or vapors supplied to the combustion chamber.

17. The process of maintaining complete combustion of flammable gases or vapors of a fuel in an enclosure which comprises causing combustion in air supplied to said enclosure in the presence of a mass of an oxidizing material reducible by an excess of flammable gases or vapors over that required to combine with all the oxygen of the air supplied to said enclosure and when so reduced oxidizable by an excess of air thereafter supplied to said enclosure and utilizing the variations in weight of said mass so to vary the ratio of fuel and air supplied to said combustion chamber to maintain complete combustion of said flammable gases or vapors.

18. The process of maintaining complete combustion of flammable gases or vapors of a fuel in a combustion chamber having a supply of air which comprises causing combustion in the presence of a mass of an oxi- Patented July 16, 1929.

1,720,758

UNITED STATES PATENT OFFICE.

SARAH AMES BORDEN, OF FALL RIVER, MASSACHUSETTS.

BROODER.

Application filed August 17, 1926. Serial No. 129,749.

This invention relates to brooders for the protection of growing poultry, and is particularly intended to provide various features necessary or desirable in the proper care and protection of young chickens and at the same time to be economical in operation.

It has become generally recognized in this art that where possible and consistent with the place of use and the type of brooder electrical heating elements may be most satisfactory and adaptable to uniform temperature control. Therefore in the present brooder I have provided a thermostatically controlled electrical heating unit which is adapted to heat an air chamber closed by a flexible membrane against which the backs of the chickens may contact. In other words the chickens may receive their warmth by direct contact with a heated membrane rather than primarily through the circulation of heated air. Such an arrangement has the advantage of providing a marked saving in the amount of heat required for the brooder. For example in a brooder of the type disclosed herein it has been found satisfactory in practice to provide a heat of approximately 100° F. In order to further aid the thermal efficiency of the brooder collapsible insulating material is placed between the heating chamber and the outer casing and the membrane is preferably adjustable in height to provide more room as the brood grows. In order to provide suitable ventilation and yet protect the chickens against drafts a foraminous wall located about the brood is adapted to permit a restricted circulation of air or ventilation through the brooder, although providing a reasonable degree of protection against cold air or drafts. This wall of foraminous material is adapted to engage the ground throughout the range of adjustment of the heating element and the flexible membrane connected thereto.

The above and further objects and advantages of the invention will become apparent to those skilled in the art upon a reading of the subjoined description and claims in conjunction with the accompanying drawings, in which:

Fig. 1 is a side elevation of my improved form of brooder;

Fig. 2 is a central vertical cross section through the brooder;

Fig. 3 is a similar view showing a different adjusted relation of the parts thereof, and Fig. 4 is a broken section of another form of brooder.

In the accompanying drawings the numeral 1 designates an outer casing of any suitable form which preferably may be a cylindrical sheet metal member supported upon the legs 2, which are adapted to rest upon the ground or other supporting surface and to hold the open bottom of casing 1 at a distance thereabove. At the central part of the casing 1 is an opening 3 through which projects an upwardly extending bolt 4 which is engaged by a thumb nut 5, the latter being adapted to hold the bolt in adjusted relation to the top of the casing. The bolt 4 supports an inner container 6 for the heating element, the periphery of which is in spaced relation to the lower edge of the casing 1. The container 6 preferably comprises a wire frame 7 supporting a heating element 8 of any desired form as for example a disk containing suitable electrical resistance elements. Preferably the walls of container 6 depend from the heating element 8 and are adapted to support a substantially circular membrane 9 which normally will be suspended above the ground. This membrane 9 may be composed of rubber or other suitable flexible material. At the central portion of this membrane or at any other convenient point is located a thermostatic control element 11 of any conventional form which is connected through suitable wiring 12 and a plug 13 with the heating element 8 and with an outside source of current. The wire frame of the container 6 is covered with a suitable member 15 of burlap fabric or the like.

Between the lower portion of the casing 1 and of the container 6 is located a suitable flexible wall 16 which may conveniently be formed of burlap. Inset in the flexible wall 16 are a plurality of quills or long feathers 17 which depend into contacting relation with the ground and compose a feathered layer of considerable thickness. These feathers are so arranged that when the element 6 is in its lowermost normal adjusted position in relation to the container 1 the entire thickness of the feathered layer may contact with the ground, while as represented in Fig. 3 when the container is in its oxidizing material and its product of reduction to vary the relative amounts of air and flammable gases or vapors of the fuel supplied to said combustion chamber.

8. A device for controlling the air-fuel ratio in combustion comprising a retort having a combination chamber, means for continuously introducing flammable gases or vapors of a fuel into said combustion chamber, means for supplying air to said chamber, a solid oxidizing material in said chamber capable of temporarily supplying sufficient oxygen to support complete combustion of said gaseous fuel and producing upon reduction a residue oxidizable by an excess of air admitted to said chamber to reproduce said oxidizing material, means yieldably supporting said oxidizing material to permit bodily movement thereof in response to variations in the weight of said material and means operable by such variations in weight to vary the relative amounts of flammable gases or vapors of the fuel and air supplied to said combustion chamber.

9. A device for controlling the air-fuel ratio in combustion comprising a retort having a combustion chamber, means for continuously introducing flammable gases or vapors of a fuel into said combustion chamber, means for supplying air to said chamber, a solid oxidizing material in said chamber capable of temporarily supplying sufficient oxygen to support complete combustion of said flammable gases or vapors of a fuel and producing upon reduction a residue oxidizable by an excess of air admitted to said chamber to reproduce said oxidizing material, means yieldably supporting said oxidizing material to permit bodily movement thereof in response to variations in the weight of said oxidizing material, means operable by such variations in weight to vary the relative amounts of flammable gases or vapors of the fuel and air supplied to said combustion chamber and thermostatic means co-operating with said regulating means to vary the total amount of flammable gases or vapors of the fuel and of the air supplied to said combustion chamber, whereby the amount of heat produced may be regulated.

10. A heating apparatus comprising a retort having a primary combustion chamber and a secondary combustion chamber communicating therewith, means for introducing gaseous fuel into said primary chamber, and means for admitting air into said primary chamber, means for delivering the products of combustion from said secondary chamber, a solid oxidizing agent in said secondary chamber capable of temporarily supplying sufficient oxygen to insure complete combustion of said gaseous fuel in the absence of sufficient free oxygen to maintain complete combustion and producing upon reduction a residue capable of combining with unconsumed oxygen supplied by an excess of air admitted, means yieldably supporting said oxidizing material and means operable by the movement of said material in response to variations in the weight thereof to regulate the relative amounts of gaseous fuel and air supplied to said combustion chambers.

11. A heating apparatus comprising a casing, a retort yieldably mounted within said casing having a central primary combustion chamber and a surrounding secondary combustion chamber communicating with said primary combustion chamber, conduits for flammable gases or vapors and for air leading to said primary combustion chamber, a solid oxidizing agent in said secondary chamber capable of temporarily supplying sufficient oxygen to maintain complete combustion of said flammable gases or vapors and producing upon reduction a residue oxidizable by unconsumed oxygen supplied by an excess of air, a valve in the conduit for supplying flammable gases and vapors, means connecting said valve to said retort operable by the movement of said retort in response to variations in the weight of said retort and its contents to regulate the amount of the flammable gases or vapors supplied to the combustion chambers.

12. A heating apparatus comprising a casing, a retort yieldably mounted within said casing having a primary combustion chamber and a secondary combustion chamber communicating with said primary combustion chamber, conduits for flammable gases or vapors and for air leading to said primary combustion chamber, a solid oxidizing agent in said secondary chamber capable of temporarily supplying sufficient oxygen to maintain complete combustion of said flammable gases or vapors and producing upon reduction a residue oxidizable by unconsumed oxygen supplied by an excess of air, a valve in the conduit for supplying said gases or vapors, means connecting said valve to said retort operable by the movement of said retort in response to variations in the weight of said retort and its contents to vary the amount of the flammable gases or vapors supplied to the combustion chambers, a valve in said air supply conduit and thermostatic means, subject to the temperature of the medium being heated, connected to said air pipe valve and operable to regulate the amount of air supplied, whereby the regulation of the respective amounts of flammable gases or vapors and of air supplied will control the output of heat produced by said heating apparatus.

13. A heating apparatus comprising a casing, a retort yieldably supported in said casing having inner and outer concentric walls forming an inner primary combustion chamber and an outer secondary combustion supporting portion, said portion being adapted to remain in fixed relation to the ground, a vertically adjustable unit carried by said supporting portion, said unit including a sheet of material to engage the backs of chickens as well as an electrical heating element, said element being supported above said sheet in spaced relation thereto, whereby a body of heated air may be maintained between the element and the sheet to form a heat reservoir, and a thermostatic control member adjoining the sheet to control energization of the heating element.

Signed by me at Fall River, Mass., this twelfth day of August, 1926.

SARAH AMES BORDEN.